United States Patent
Takeuchi et al.

(10) Patent No.: US 11,629,682 B2
(45) Date of Patent: Apr. 18, 2023

(54) VEHICLE CONTROLLING APPARATUS

(71) Applicant: SUBARU CORPORATION, Tokyo (JP)

(72) Inventors: Motohiro Takeuchi, Tokyo (JP); Junpei Tsuchiya, Tokyo (JP); Yoshinori Soda, Tokyo (JP); Naoki Furune, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/398,309

(22) Filed: Aug. 10, 2021

(65) Prior Publication Data
US 2022/0056876 A1    Feb. 24, 2022

(30) Foreign Application Priority Data
Aug. 19, 2020   (JP) .............................. JP2020-138342

(51) Int. Cl.
*F02N 11/08*     (2006.01)
*H01M 10/48*    (2006.01)
*B60K 6/24*      (2007.10)

(52) U.S. Cl.
CPC ...... *F02N 11/0833* (2013.01); *F02N 11/0862* (2013.01); *H01M 10/48* (2013.01); *B60K 6/24* (2013.01); *B60Y 2200/92* (2013.01); *F02N 2200/061* (2013.01); *H01M 2220/20* (2013.01)

(58) Field of Classification Search
CPC ............. F02N 11/0825; F02N 11/0833; F02N 11/0862; H01M 10/48; H01M 50/569
See application file for complete search history.

(56) References Cited

U.S. PATENT DOCUMENTS

| | | | |
|---|---|---|---|
| 2014/0347059 A1* | 11/2014 | Sato | G01R 31/392 324/430 |
| 2015/0258948 A1* | 9/2015 | Planas | F02N 11/0818 307/10.6 |
| 2016/0011275 A1* | 1/2016 | Saito | F02N 11/0862 324/430 |

(Continued)

FOREIGN PATENT DOCUMENTS

| | | | |
|---|---|---|---|
| EP | 3683913 A1 * | 7/2020 | ............ B60R 16/04 |
| JP | 2018-111456 A | 7/2018 | |
| JP | 2019-160662 A | 9/2019 | |

*Primary Examiner* — Logan M Kraft
*Assistant Examiner* — Anthony L Bacon
(74) *Attorney, Agent, or Firm* — McDermott Will & Emery LLP

(57) ABSTRACT

A vehicle controlling apparatus includes an engine processor, an electric motor, an electric power storage, an SOC detector, an internal resistance detector, and a resistance threshold setting unit. The engine processor is configured to stop an engine of a vehicle on the basis of a stop condition, and start the engine on the basis of a start condition. The engine processor is configured to prohibit a stop of the engine based on the stop condition based on determining that an internal resistance of the electric power storage detected by the internal resistance detector is equal to or greater than a resistance threshold set by the resistance threshold setting unit on the basis of a state of charge of the electric power storage, and permit the stop of the engine based on determining that the internal resistance is less than the resistance threshold.

6 Claims, 10 Drawing Sheets

(56) References Cited

U.S. PATENT DOCUMENTS

| | | | | |
|---|---|---|---|---|
| 2018/0003774 A1* | 1/2018 | Iida | ............... | G01R 31/3842 |
| 2019/0334371 A1 | 10/2019 | Watanabe et al. | | |
| 2021/0123980 A1* | 4/2021 | Kataoka | ............... | G01R 31/374 |
| 2022/0091189 A1* | 3/2022 | Osamura | ............... | H01M 10/48 |
| 2022/0200328 A1* | 6/2022 | Matsuda | ............... | H02J 7/0063 |

* cited by examiner

VEHICLE CONTROLLING APPARATUS

CROSS-REFERENCE TO RELATED APPLICATIONS

The present application claims priority from Japanese Patent Application No. 2020-138342 filed on Aug. 19, 2020, the entire contents of which are hereby incorporated by reference.

BACKGROUND

The technology relates to a vehicle controlling apparatus to be applied to a vehicle having an engine.

A vehicle such as a hybrid vehicle or a start-stop vehicle stops an engine on the basis of a predetermined stop condition, and starts the engine on the basis of a predetermined start condition. For example, reference is made to Japanese Unexamined Patent Application Publication Nos. 2018-111456 and 2019-160662. For example, the hybrid vehicle stops the engine in response to satisfaction of the stop condition in a case where requested driving force requested to the vehicle is small, and starts the engine in response to satisfaction of the start condition in a case where the requested driving force is large. The start-stop vehicle stops the engine in response to satisfaction of the stop condition in a case where a vehicle speed falls below a predetermined vehicle speed with a brake pedal being pressed, and starts the engine in response to satisfaction of the start condition in a case where the pressing of the brake pedal is released or where an accelerator pedal is pressed.

SUMMARY

An aspect of the technology provides a vehicle controlling apparatus to be applied to a vehicle. The vehicle controlling apparatus includes an engine processor, an electric motor, an electric power storage, an SOC detector, an internal resistance detector, and a resistance threshold setting unit. The engine processor is configured to stop an engine of the vehicle on the basis of a stop condition, and start the engine on the basis of a start condition. The electric motor is configured to start and rotate the engine upon starting the engine on the basis of the start condition. The electric power storage is coupled to the electric motor. The SOC detector is configured to detect a state of charge of the electric power storage. The internal resistance detector is configured to detect an internal resistance of the electric power storage. The resistance threshold setting unit is configured to set a resistance threshold on the basis of the state of charge. The engine processor is configured to prohibit a stop of the engine that is based on the stop condition based on determining that the internal resistance is equal to or greater than the resistance threshold, and permit the stop of the engine based on determining that the internal resistance is less than the resistance threshold.

An aspect of the technology provides a vehicle controlling apparatus to be applied to a vehicle. The vehicle controlling apparatus includes circuitry, an electric motor, an electric power storage, and a battery sensor. The circuitry is configured to stop an engine of the vehicle on the basis of a stop condition, and start the engine on the basis of a start condition. The electric motor is configured to start and rotate the engine upon starting the engine on the basis of the start condition. The electric power storage is coupled to the electric motor. The battery sensor is configured to detect a state of charge of the electric power storage and detect an internal resistance of the electric power storage. The circuitry is further configured to set a resistance threshold on the basis of the state of charge, prohibit a stop of the engine that is based on the stop condition, based on determining that the internal resistance is equal to or greater than the resistance threshold, and permit the stop of the engine, based on determining that the internal resistance is less than the resistance threshold.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
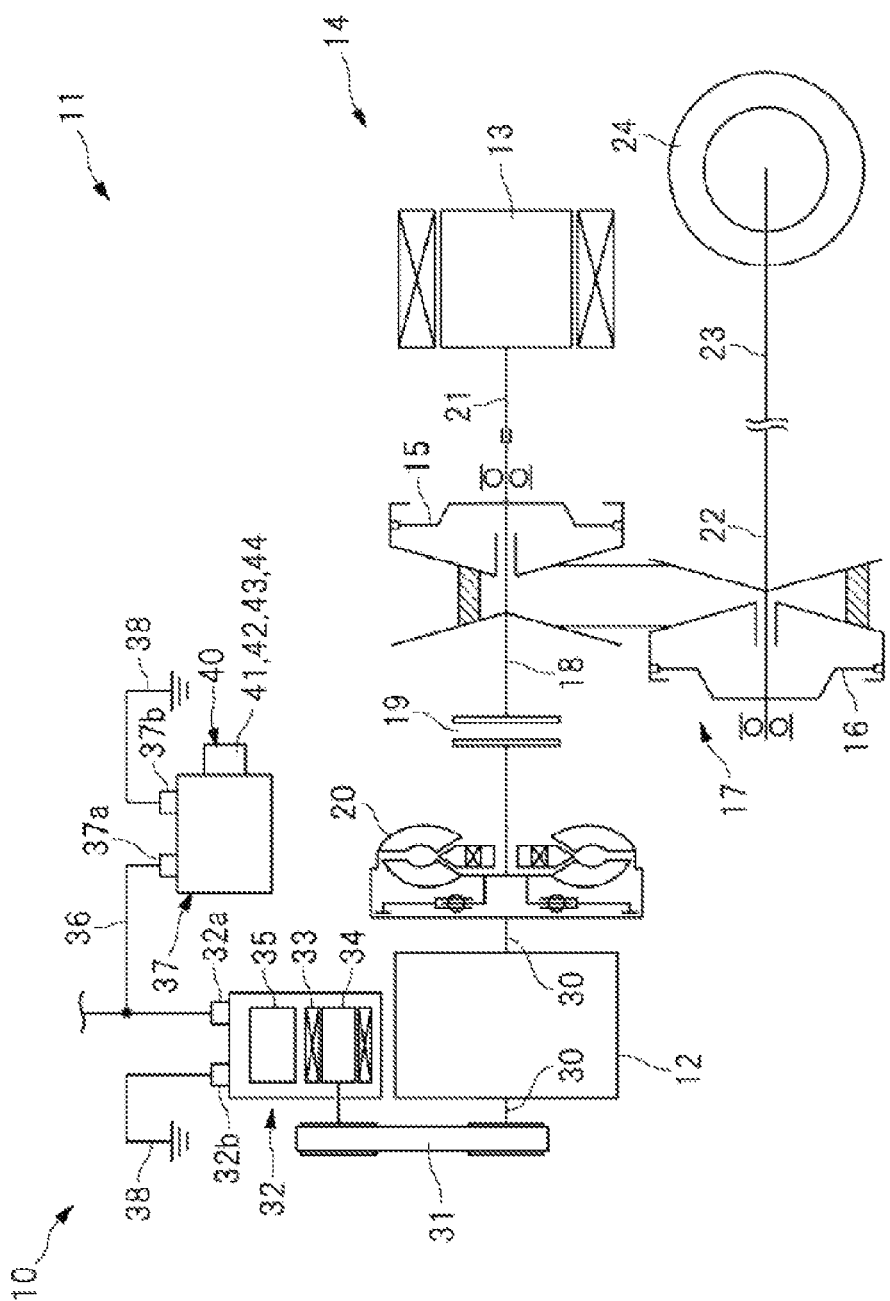
FIG. 1 is a diagram schematically illustrating an example of a vehicle to which a vehicle controlling apparatus according to one example embodiment of the technology is applied.

A device such as a starter motor is used to start and rotate an engine in a case where a start condition is satisfied during a stop of the engine. In this case, it is necessary to supply enough electric power to the starter motor from a battery. In preparation for a restart of the engine after the engine is stopped on the basis of a stop condition, what is important is to cause a state of charge (SOC) of the battery to be increased in advance upon stopping the engine on the basis of the stop condition. Permitting the stop of the engine only when the SOC of the battery is high, however, can decrease the opportunity for stopping the engine.

It is desirable to provide a vehicle controlling apparatus that makes it possible to increase the opportunity for stopping an engine.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

[Powertrain]

FIG. 1 schematically illustrates a vehicle 11 to which a vehicle controlling apparatus 10 according to an example embodiment of the technology is applied. Referring to FIG. 1, the vehicle 11 may have a powertrain 14 that includes an engine 12 and a motor generator 13 each serving as a drive source. The powertrain 14 may also have a continuously variable transmission 17 that includes a primary pulley 15 and a secondary pulley 16. The primary pulley 15 may be supported by a primary shaft 18 having a first end and a second end. The first end of the primary shaft 18 may be coupled to the engine 12 via an input clutch 19 and a torque converter 20. The second end of the primary shaft 18 may be coupled to the motor generator 13 via a rotor shaft 21. The secondary pulley 16 may be supported by a secondary shaft 22. The secondary shaft 22 may be coupled to wheels 24 via members including an output shaft 23.

[Starter Generator and Battery]

The engine 12 may have a crankshaft 30 that is coupled to a starter generator 32 via a belt mechanism 31. In one embodiment, the starter generator 32 may serve as an "electric motor". The starter generator 32 may be a so-called integrated starter generator (ISG) that functions both as a generator and a motor. The starter generator may function not only as the generator that is driven and rotated by the crankshaft 30 and thus generates electric power, but also as the motor that drives and rotates the crankshaft 30. For example, the starter generator 32 functioning as the motor may start the rotation of the engine 12 in a case where the engine 12 is to be started in response to satisfaction of a predetermined start condition.

The starter generator 32 may have a stator 33 including a stator coil and a rotor 34 including a field coil. The starter generator 32 may also have an ISG processor 35 that controls electric conduction states of the stator coil and the field coil. The ISG processor 35 may have devices including an inverter, a regulator, and a microcomputer. The starter generator 32 may further have a positive terminal 32a that is electrically coupled to a positive terminal 37a of a battery 37 via an electric conduction line 36. In one embodiment, the battery 37 may serve as an "electric power storage". Non-limiting examples of the battery 37 may include a lead-acid battery and a lithium-ion battery.

The battery 37 may include a battery sensor 40. The battery sensor 40 may have a function of detecting states of the battery 37, including a charge/discharge current, a terminal voltage, a state of charge (SOC), and an internal resistance of the battery 37. In some embodiments, the battery sensor 40 may include a current detector 41 that detects the charge/discharge current of the battery 37, a voltage detector 42 that detects the terminal voltage of the battery 37, an SOC detector 43 that detects the SOC of the battery 37, and an internal resistance detector 44 that detects the internal resistance of the battery 37. In one embodiment, the SOC detector 43 may serve as an "SOC detector". In one embodiment, the internal resistance detector 44 may serve as an "internal resistance detector".

The SOC of the battery 37 refers to a ratio that indicates a remaining amount of electric power stored in the battery 37, and is defined as a ratio of an amount of electric power stored in the battery 37 to a full charge capacity of the battery 37. For example, the SOC detector 43 of the battery sensor 40 may calculate the SOC of the battery 37 by estimating the SOC on the basis of the terminal voltage of the battery 37, or by integrating the charge/discharge current of the battery 37. For example, the internal resistance detector 44 of the battery sensor 40 may calculate the internal resistance of the battery 37 by dividing the terminal voltage of the battery 37 by the charge/discharge current of the battery 37.

[Control System]

Figure 2:
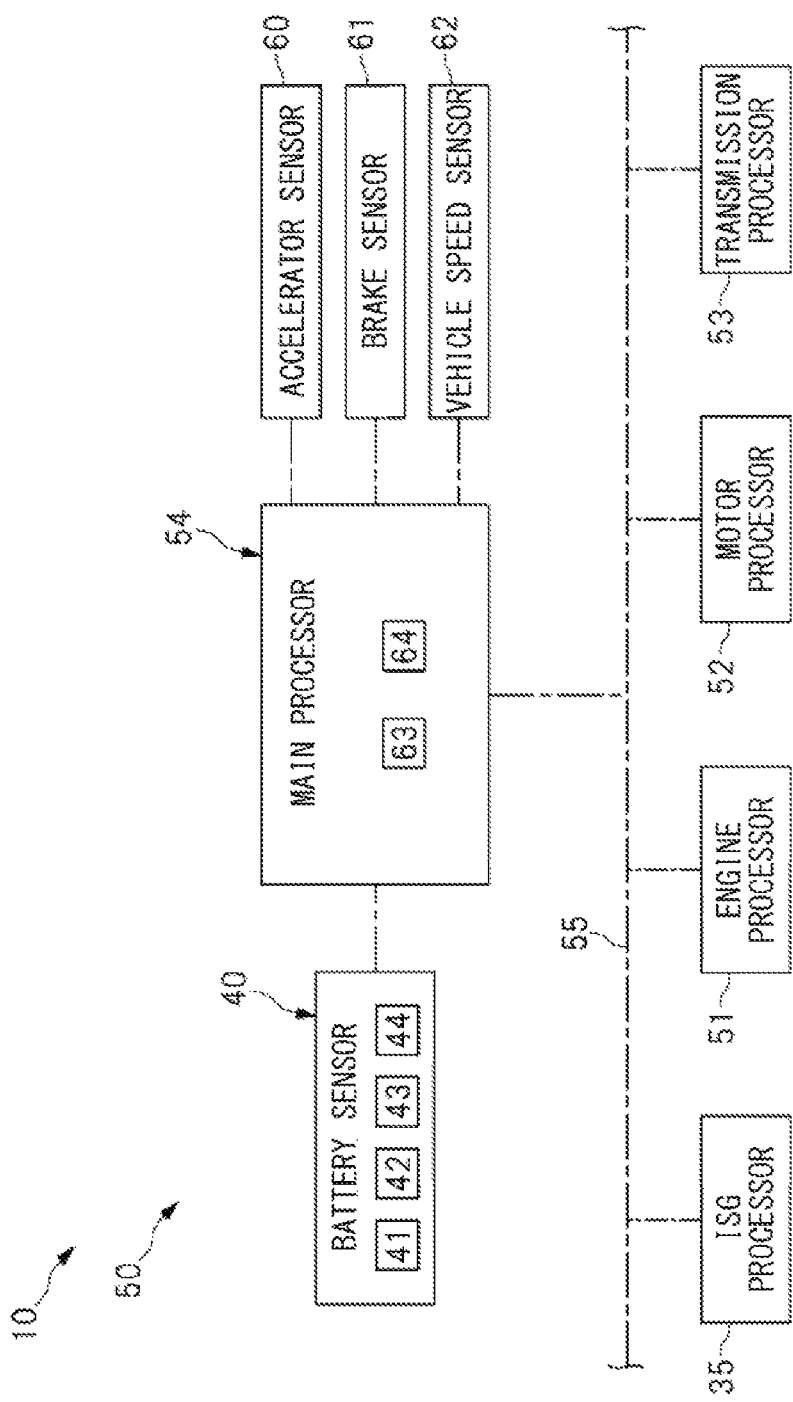
FIG. 2 is a diagram schematically illustrating an example of a configuration of a control system provided in the vehicle controlling apparatus.

FIG. 2 schematically illustrates an example of a configuration of a control system 50 provided in the vehicle controlling apparatus 10. Referring to FIG. 2, the vehicle controlling apparatus 10 may include a plurality of processors structuring the control system 50 that controls the powertrain 14. The plurality of processors each may be or include a microcomputer. Non-limiting examples of the processors structuring the control system 50 may include, in addition to the ISG processor 35 described above: an engine processor 51 that controls the engine 12; a motor processor 52 that controls the motor generator 13; a transmission processor 53 that controls devices including the continuously variable transmission 17 and the input clutch 19; and a main processor 54 that controls the ISG processor 35, the engine processor 51, the motor processor 52, and the transmission processor 53 in an overall fashion. The ISG processor 35, the engine processor 51, the motor processor 52, the transmission processor 53, and the main processor 54 may be so coupled to each other via an in-vehicle network 55 as to allow for a communication freely therebetween via the in-vehicle network such as a controller area network (CAN) or a local interconnect network (LIN).

The main processor 54 may be coupled to various sensors that detect a driving status and a traveling status. Non-limiting examples of the sensors may include: an accelerator sensor 60 that detects an amount of pressing performed on an accelerator pedal (hereinafter referred to as an "accelerator position"); a brake sensor 61 that detects an amount of pressing performed on a brake pedal; a vehicle speed sensor 62 that detects a vehicle speed as a traveling speed of the vehicle 11; and the battery sensor 40 that detects the states of the battery 37 including the SOC and the internal resistance. The main processor 54 may also include a traveling mode processor 63. The traveling mode processor 63 may select a traveling mode between an EV mode and an HEV mode, and control the powertrain 14 on the basis of the selected traveling mode.

[Traveling Mode]

Figure 3A:
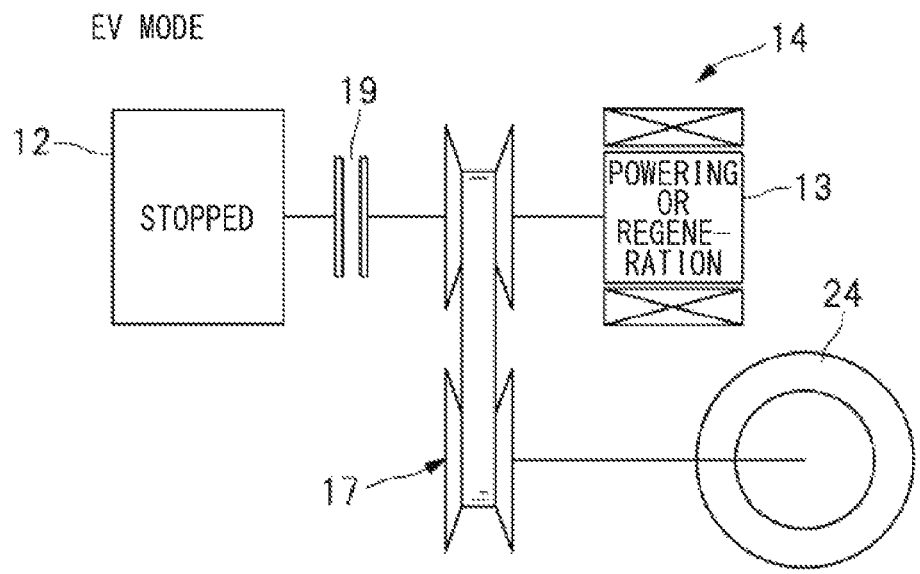
FIG. 3A is a diagram illustrating an example of a state in which an EV mode is in execution.
Figure 3B:
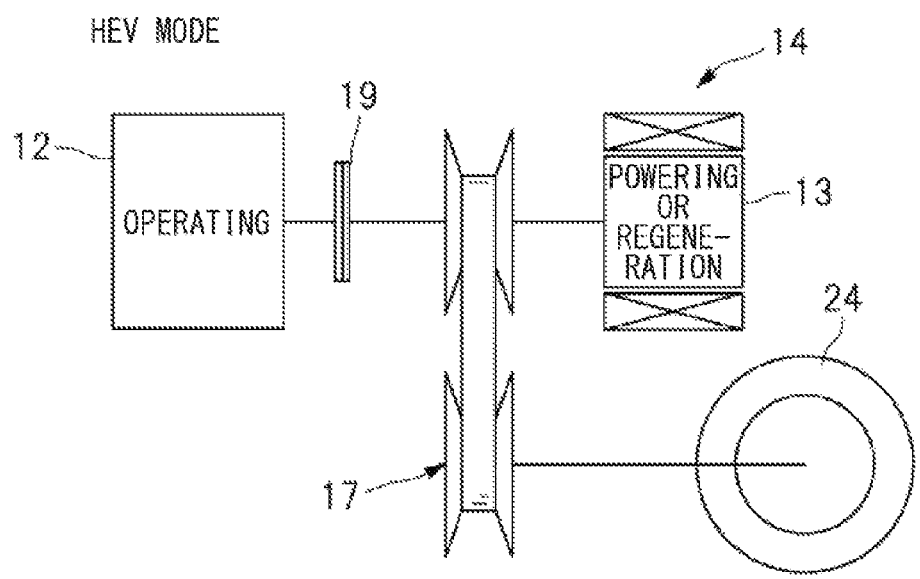
FIG. 3B is a diagram illustrating an example of a state in which an HEV mode is in execution.

FIG. 3A illustrates a state in which the EV mode is in execution. FIG. 3B illustrates a state in which the HEV mode is in execution. The vehicle 11 may have, as the traveling modes: the EV mode that stops the engine 12 and drives the motor generator 13; and the HEV mode that drives both the engine 12 and the motor generator 13.

Referring to FIG. 3A, upon execution of the EV mode as the traveling mode, the traveling mode processor 63 of the main processor 54 may control the input clutch 19 to be in a disengaged state, control the engine 12 to be in a stopped state, and control the motor generator 13 to be in a powering state or a regeneration state. Thus, it is possible to control the traveling state of the vehicle 11 by means of a torque of the motor generator 13. Referring to FIG. 3B, upon execution of the HEV mode as the traveling mode, the traveling mode processor 63 of the main processor 54 may control the input clutch 19 to be in an engaged state, control the engine 12 to be in an operating state, and control the motor generator 13 to be in the powering state or the regeneration state. Thus, it is possible to control the traveling state of the vehicle 11 by means of a torque of the engine 12 and the torque of the motor generator 13.

Figure 4:
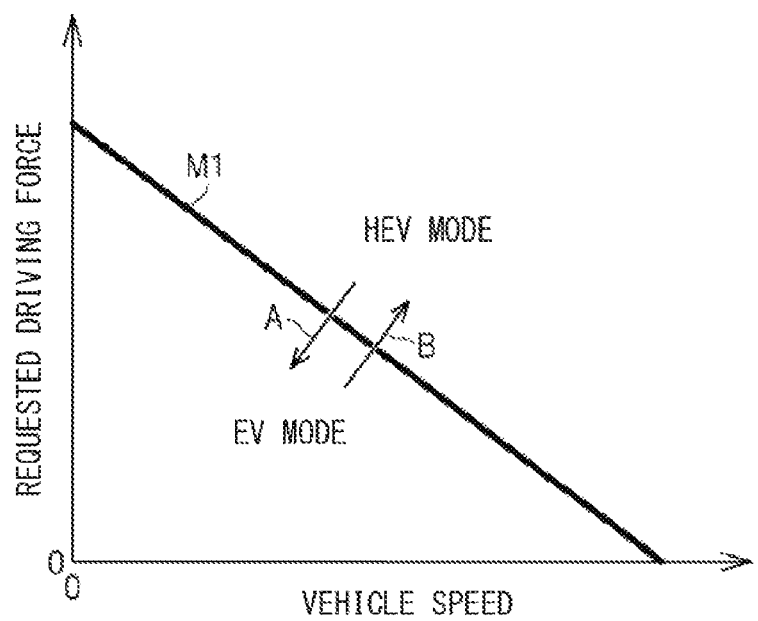
FIG. 4 is a traveling mode map illustrating an example of regions in which the EV mode and the HEV mode are to be executed.

FIG. 4 is a traveling mode map illustrating an example of regions in which the EV mode and the HEV mode are to be executed. Referring to FIG. 4, a mode threshold M1 may be set for the traveling mode map. The mode threshold M1 may define the regions in which the EV mode and the HEV mode are to be executed. As denoted by an arrow A of FIG. 4, the traveling mode may be switched from the HEV mode to the EV mode, in a case where requested driving force and/or the vehicle speed so decrease as to fall below the mode threshold M1 during the HEV mode. In other words, a predetermined stop condition may be satisfied and the engine 12 may be stopped accordingly in a case where the requested driving force and/or the vehicle speed so decrease as to fall below the mode threshold M1. As denoted by an arrow B of FIG. 4, the traveling mode may be switched from the EV mode to the HEV mode, in a case where the requested driving force and/or the vehicle speed so increase as to exceed the mode threshold M1 during the EV mode. In other words, a predetermined start condition may be satisfied and the engine 12 may be started accordingly in a case where the requested driving force and/or the vehicle speed so increase as to exceed the mode threshold M1.

The traveling mode processor 63 of the main processor 54 may select the traveling mode between the EV mode and the HEV mode on the basis of the requested driving force and/or the vehicle speed, and execute the selected traveling mode. In other words, the traveling mode processor 63 of the main processor 54 may stop the engine 12 on the basis of the predetermined stop condition, and start the engine 12 on the basis of the predetermined start condition. In one embodiment, the traveling mode processor 63 may serve as an "engine processor". For example, the requested driving force may be set on the basis of the accelerator position. The requested driving force may be set to be large in response to an increase in the accelerator position resulting from the pressing performed on the accelerator pedal, and may be set to be small in response to a decrease in the accelerator position resulting from a release of the pressing performed on the accelerator pedal.

[Engine Stop Permission Determination (Outline)]

As described previously, the stop condition of the engine may be satisfied and the engine 12 may be stopped accordingly in a case where the requested driving force and/or the vehicle speed so decrease as to fall below the mode threshold M1. In this case, the traveling mode may be switched from the HEV mode to the EV mode. It is to be noted that it is important to cause the SOC of the battery 37 to be increased in advance upon stopping the engine 12 on the basis of the stop condition, in preparation for a restart of the engine 12 resulting from satisfaction of the start condition after the engine 12 is stopped on the basis of the stop condition. Stopping the engine 12 in a state in which the SOC is decreased can lead to a lack of electric power to be supplied to the starter generator 32 and can involve difficulties in restarting the engine 12. Accordingly, it is important to prohibit the engine 12 from being stopped upon the decrease in the SOC.

However, permitting the stop of the engine 12 only when the SOC of the battery 37 is high can decrease the opportunity for stopping the engine 12. To address this concern, the traveling mode processor 63 of the main processor 54 may determine whether to permit the engine stop (hereinafter referred to as "engine stop permission determination") as described later in greater detail to determine whether the electric power to be supplied from the battery 37 to the starter generator 32 is sufficient, i.e., whether engine startability of the starter generator 32 is secured. In a case where the engine startability is determined as being secured, the traveling mode processor 63 may permit the engine stop even upon the decrease in the SOC of the battery 37. This makes it possible to increase the opportunity for stopping the engine 12, i.e., the opportunity of executing the EV mode and thereby to improve fuel economy performance of the vehicle 11 as described later in greater detail. To execute the engine stop permission determination, the main processor 54 includes a resistance threshold setting unit 64 that sets a resistance threshold on the basis of the SOC. In one embodiment, the resistance threshold setting unit 64 may serve as a "resistance threshold setting unit".

[Engine Startability]

Figure 5:
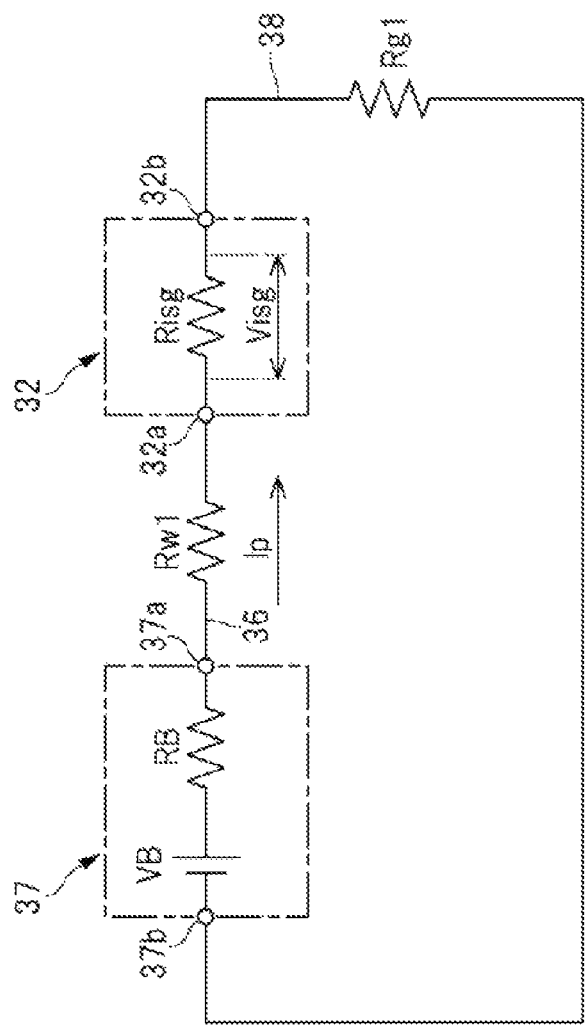
FIG. 5 is a circuit diagram schematically illustrating an example of an engine starting system.

A description is given now of the engine startability of the starter generator 32. FIG. 5 is a circuit diagram schematically illustrating an example of an engine starting system. Referring to FIG. 5, the positive terminal 37a of the battery 37 and the positive terminal 32a of the starter generator 32 may be coupled via the electric conduction line 36. A negative terminal 37b of the battery 37 and a negative terminal 32b of the starter generator 32 may be coupled via an electric conduction line 38. Further, in FIG. 5, the terminal voltage of the battery 37 is denoted as "VB", the internal resistance of the battery is denoted as "RB", a terminal voltage of the starter generator 32 is denoted as "Visg", and an internal resistance of the starter generator 32 is denoted as "Risg". An electrical resistance of the electric conduction line 36 is denoted as "Rw1", an electrical resistance of the electric conduction line 38 is denoted as "Rg1", and an electric conduction current that flows from the battery 37 to the starter generator 32 is denoted as "Ip".

The engine startability of the starter generator 32 depends on power consumption Wisg of the starter generator 32 upon the start of the engine 12. In other words, a larger kinetic energy is outputted from the starter generator 32 as the power consumption Wisg of the starter generator 32 becomes larger, allowing the engine startability of the starter generator 32 to be higher. The power consumption Wisg of the starter generator 32 is calculated by multiplying the terminal voltage Visg by the electric conduction current Ip as expressed by the Expression (1). Accordingly, the power consumption Wisg increases as the terminal voltage Visg rises, and the power consumption Wisg increases as the electric conduction current Ip increases. The terminal voltage Visg that forms the Expression (1) rises as the terminal voltage VB of the battery 37 rises, and rises as the internal resistance RB of the battery 37 decreases, as expressed by the Expression (2). The electric conduction current Ip that forms the Expression (1) increases as the terminal voltage VB of the battery 37 rises, and increases as the internal resistance RB of the battery 37 decreases, as expressed by the Expression (3).

$$Wisg = Visg \times Ip \qquad (1)$$

$$Visg = VB - (RB + Rw1 + Rg1) \times Ip \quad (2)$$

$$Ip = VB / (RB + Rw1 + Risg + Rg1) \quad (3)$$

As can be appreciated from the above Expressions (1) to (3), a situation in which the power consumption Wisg of the starter generator 32 increases includes a case where the terminal voltage VB of the battery 37 rises, or includes a case where the internal resistance RB of the battery 37 decreases. In other words, it is possible to secure the power consumption Wisg necessary for starting the engine 12 in a case where the internal resistance RB of the battery 37 is decreased, even in a case where the terminal voltage VB of the battery 37 is decreased. In addition, it is possible to secure the power consumption Wisg necessary for starting the engine 12 in a case where the terminal voltage VB of the battery 37 is risen, even in a case where the internal resistance RB of the battery 37 is increased. Accordingly, in order to determine whether the engine startability is sufficient, it is important to determine a magnitude of the power consumption Wisg appropriately not only on the basis of the SOC that is interlocked with the terminal voltage VB but also on the basis of the internal resistance RB of the battery 37.

[Engine Stop Permission Determination (Flowchart)]

Figure 6:
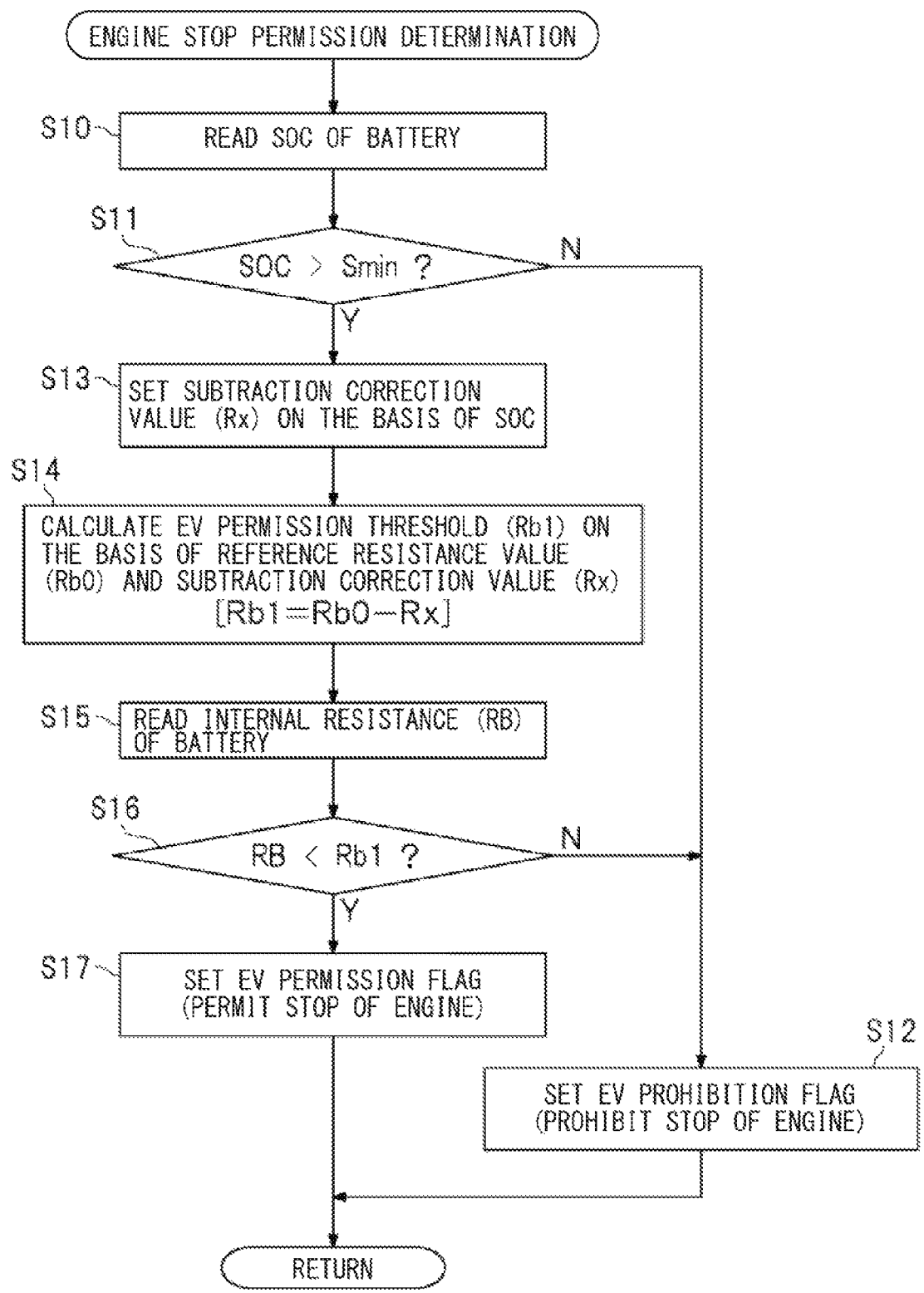
FIG. 6 is a flowchart illustrating an example of an execution procedure of determining whether to permit an engine stop.
Figure 7:
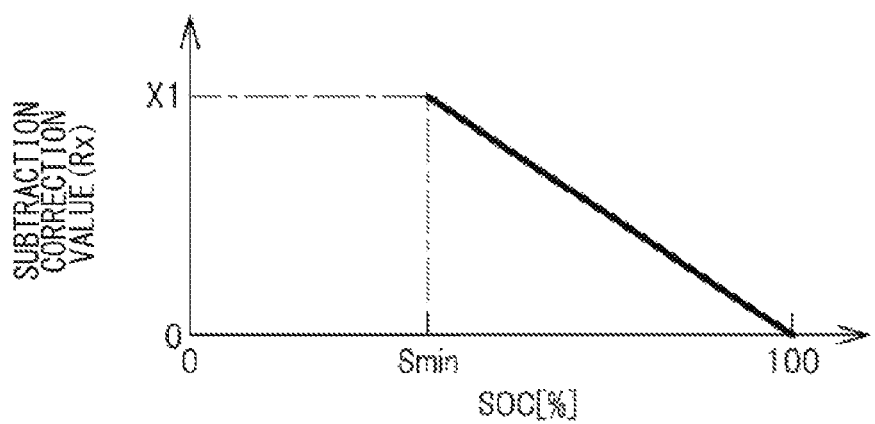
FIG. 7 is a diagram illustrating an example of a subtraction correction value.
Figure 8:
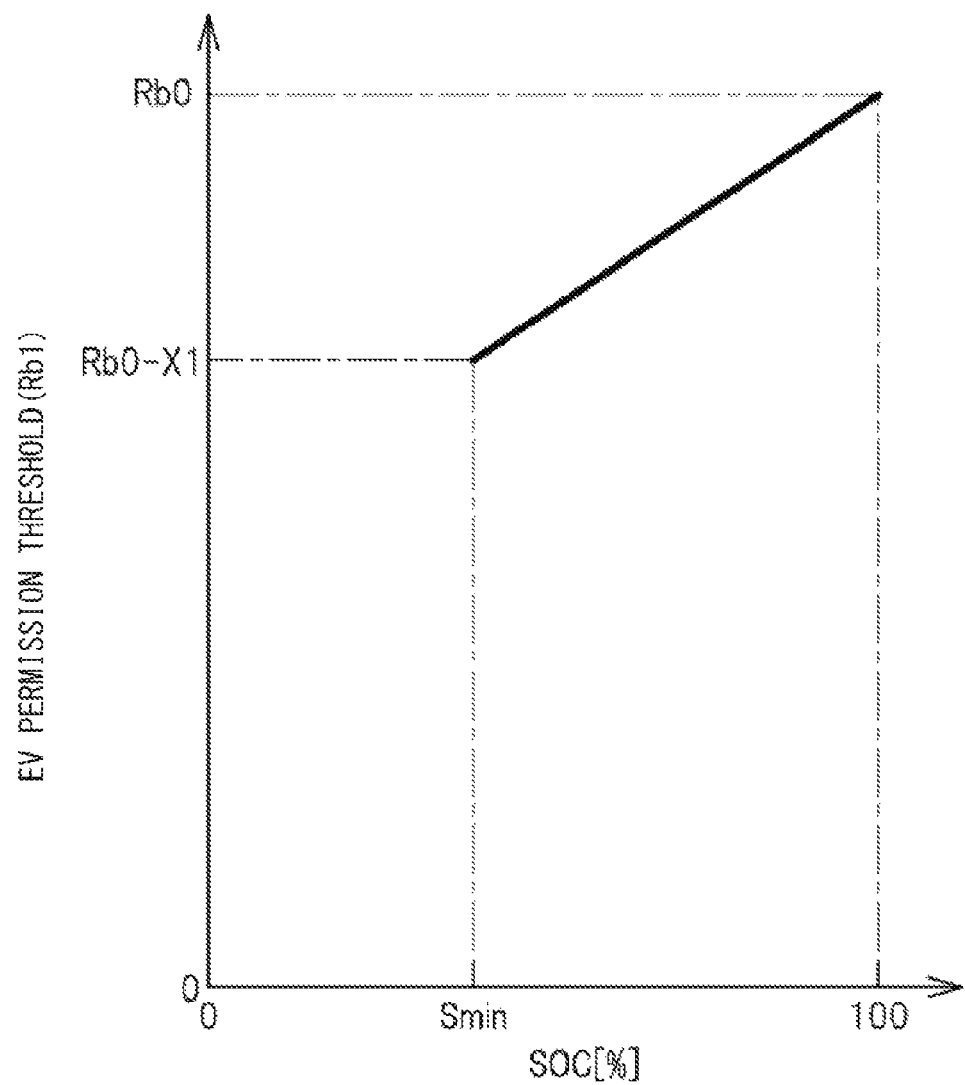
FIG. 8 is a diagram illustrating an example of an EV permission threshold.
Figure 9:
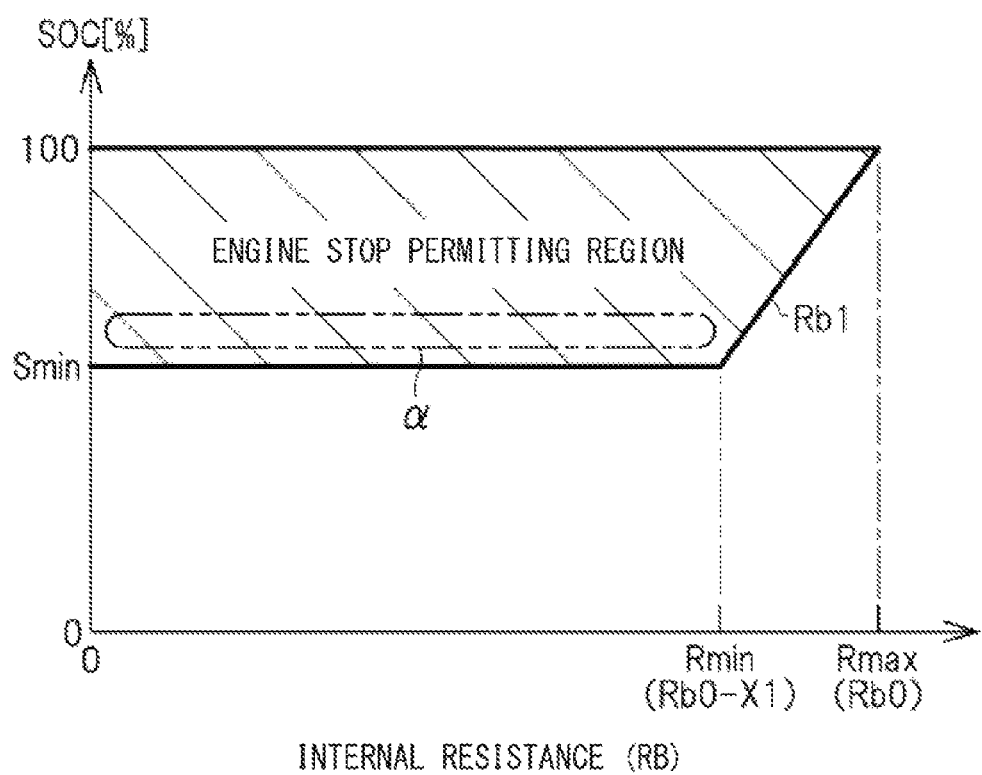
FIG. 9 is a diagram illustrating an example of an engine stop permitting region in which an EV permission flag is to be set.

A description is given now of an execution procedure of the engine stop permission determination with reference to a flowchart. FIG. 6 is a flowchart illustrating an example of the execution procedure of the engine stop permission determination. FIG. 7 illustrates an example of a subtraction correction value Rx. FIG. 8 illustrates an example of an EV permission threshold Rb1. FIG. 9 illustrates an example of an engine stop permitting region in which an EV permission flag is to be set.

Referring to FIG. 6, in step S10, the main processor 54 may read the SOC detected by the battery sensor 40. Thereafter, in step S11, the main processor 54 may determine whether the SOC of the battery 37 is greater than a predetermined lower limit Smin. In step S11, if the SOC of the battery 37 is determined as being equal to or less than the lower limit Smin (step S11: N), i.e., the SOC of the battery 37 is determined as being decreased greatly, the flow may proceed to step S12 because the restart of the engine 12 by the starter generator 32 is difficult. In step S12, an EV prohibition flag that prohibits the stop of the engine 12 may be set. The stop of the engine 12 on the basis of the predetermined stop condition may be prohibited and the switching from the HEV mode to the EV mode may be prohibited accordingly, in a case where the EV prohibition flag is set.

In step S11, if the SOC of the battery 37 is determined as being greater than the lower limit Smin (step S11: Y), the flow may proceed to step S13. In step S13, the subtraction correction value Rx may be set on the basis of the SOC. Referring to FIG. 7, the subtraction correction value Rx may be set to be smaller as the SOC becomes higher. For example, the subtraction correction value Rx may be set to "X1" in a case where the SOC is "Smin", and may be set to "0" in a case where the SOC is "100%". In other words, the subtraction correction value Rx may be set to be larger in a case where the SOC is lower, i.e., the terminal voltage VB is lower, and set to be smaller in a case where the SOC is higher, i.e., the terminal voltage VB is higher.

The flow may proceed to step S14 after the subtraction correction value Rx is set on the basis of the SOC in step S13. In step S14, the EV permission threshold Rb1 may be calculated by subtracting the subtraction correction value Rx from a predetermined reference resistance value Rb0, as expressed by the Expression (4) below. In one embodiment, the EV permission threshold Rb1 may serve as a "resistance threshold". The reference resistance value Rb0 represented in the Expression (4) may be an internal resistance of the battery 37 in a fully-charged state, and may be a resistance value set in advance by a test, a simulation, or the like. Referring to FIG. 8, the EV permission threshold Rb1 may be calculated to be larger as the SOC becomes higher. For example, the EV permission threshold Rb1 may be calculated as being "Rb0-X1" in a case where the SOC is "Smin", and may be calculated as being "Rb0" in a case where the SOC is "100%". In other words, the EV permission threshold Rb1 may be calculated to be smaller in a case where the SOC is lower, i.e., the terminal voltage VB is lower, and calculated to be larger in a case where the SOC is higher, i.e., the terminal voltage VB is higher.

$$Rb1 = Rb0 - Rx \quad (4)$$

In step S15 after step S14, the main processor 54 may read the internal resistance RB of the battery 37 detected by the battery sensor 40. Thereafter, the flow may proceed to step S16. In step S16, the main processor 54 may determine whether the internal resistance RB is less than the EV permission threshold Rb1. In step S16, if the internal resistance RB is determined as being less than the EV permission threshold Rb1 (step S16: Y), the flow may proceed to step S17 because the internal resistance RB is low and it is possible to output the large current upon the start of the engine 12 accordingly, i.e., it is possible to secure the power consumption Wisg necessary for starting the engine 12. In step S17, the EV permission flag that permits the stop of the engine 12 may be set. The engine 12 may be controlled to be in the stopped state and the traveling mode may be switched from the HEV mode to the EV mode in response to the satisfaction of the stop condition resulting from, for example, the decrease in the requested driving force as denoted by the arrow A of FIG. 4, in a case where the EV permission flag is set.

In step S16, if the internal resistance RB is determined as being equal to or greater than the EV permission threshold Rb1 (step S16: N), the flow may proceed to step S12 because the internal resistance RB is high and it is difficult to output the large current upon the start of the engine 12 accordingly, i.e., it is difficult to secure the power consumption Wisg necessary for starting the engine 12. In step S12, the EV prohibition flag that prohibits the stop of the engine 12 may be set. The operating state of the engine 12 may be continued with the traveling mode being kept to the HEV mode even when the stop condition resulting from, for example, the decrease in the requested driving force is satisfied as denoted by the arrow A of FIG. 4, in a case where the EV prohibition flag is set.

As described above with reference to FIG. 8, the EV permission threshold Rb1 that is subjected to comparison with the internal resistance RB may be set to be smaller as the SOC of the battery 37 becomes lower. Thus, in a case where the SOC is decreased, it is possible to allow the internal resistance RB required for the battery 37 to be decreased and secure the power consumption Wisg necessary for starting the engine 12 accordingly. In other words, it is possible to increase the electric conduction current Ip of the starter generator 32 to secure the power consumption Wisg necessary for starting the engine 12 and permit the stop of the engine that is based on the predetermined stop condition accordingly in a region in which the internal resistance RB of the battery 37 is smaller than the EV permission threshold Rb1 as denoted by a reference sign α of FIG. 9, even in a situation where the SOC of the battery 37 is low, i.e., where the terminal voltage VB of the battery 37 is low. Note that the engine stop permitting region hatched in FIG. 9 is a region in which the SOC is greater than the lower limit Smin and the internal resistance RB is less than the EV permission threshold Rb1.

According to an example embodiment described above, the EV permission threshold Rb1 is set on the basis of the SOC of the battery 37. Further, the stop of the engine 12 that is based on the stop condition is prohibited in a case where the internal resistance RB of the battery 37 is equal to or greater than the EV permission threshold Rb1, and the stop of the engine 12 that is based on the stop condition is permitted in a case where the internal resistance RB of the battery 37 is less than the EV permission threshold Rb1. Thus, it is possible to permit the stop of the engine 12 that is based on the stop condition while securing the power consumption Wisg necessary for starting the engine 12, even in a state where the SOC of the battery 37 is decreased. Hence, it is possible to increase the opportunity for stopping the engine 12 and thereby to improve the fuel economy performance of the vehicle 11.

Figure 10:
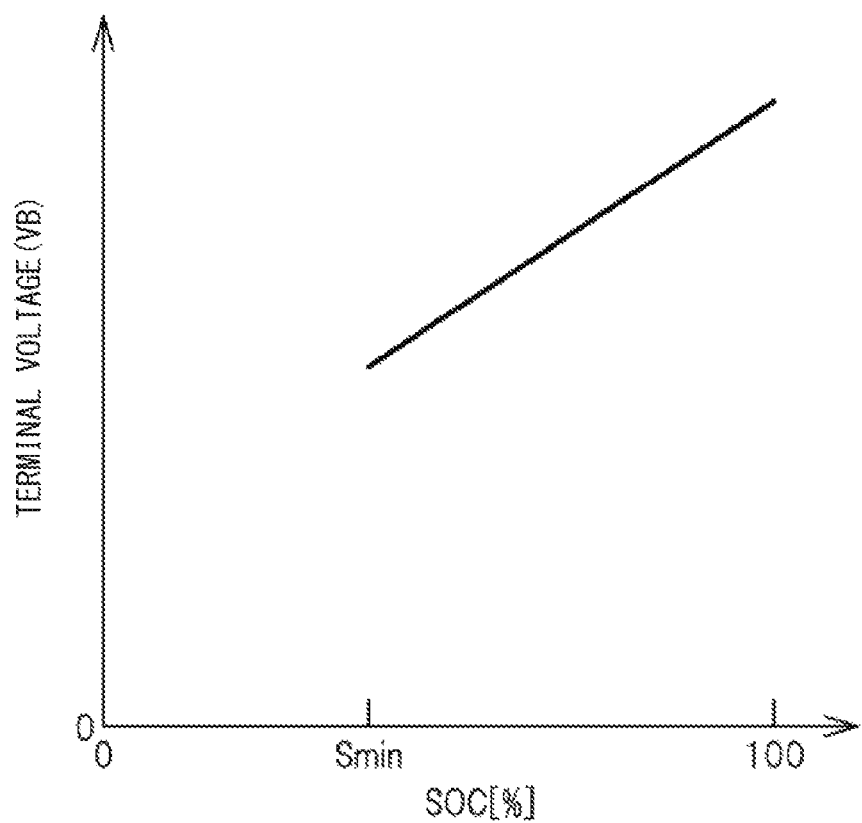
FIG. 10 is a diagram illustrating an example of a relationship between SOC and a terminal voltage VB.

In an example embodiment described above, the subtraction correction value Rx may be set on the basis of the SOC of the battery 37 by referring to predetermined data illustrated in FIG. 7. A method of setting the subtraction correction value Rx, however, is not limited thereto. In some embodiments, the subtraction correction value Rx may be calculated from the SOC of the battery 37. FIG. 10 illustrates an example of a relationship between the SOC and the terminal voltage VB. Referring to FIG. 10, estimating the terminal voltage VB from the SOC of the battery 37 makes it possible to calculate the subtraction correction value Rx from the terminal voltage VB, on the basis of the Expression (5) below. A terminal voltage Vb0 of the battery 37 represented in the Expression (5) may be a terminal voltage of the battery 37 in the fully-charged state, and may be a voltage value set in advance by a test, a simulation, or the like. A consumption current Iisg of the starter generator 32 represented in the Expression (5) may be a current that flows to the starter generator 32 upon the start of the engine 12 from the battery 37 that is in the fully-charged state, and may be a current value set in advance by a test, a simulation, or the like. In other words, "Vb0" and "Iisg" included in the Expression (5) are fixed values, making it possible to calculate the subtraction correction value Rx on the basis of the terminal voltage VB estimated from the SOC of the battery 37.

$$Rx=(Vb0-VB)/Iisg \quad (5)$$

In an example embodiment described above, the EV permission threshold Rb1 serving as the "resistance threshold" in one embodiment may be set on the basis of the SOC of the battery 37 by subtracting the subtraction correction value Rx from the reference resistance value Rb0, after setting the subtraction correction value Rx on the basis of the SOC of the battery 37. A method of setting the EV permission threshold Rb1, however, is not limited thereto. In some embodiments, the EV permission threshold Rb1 serving as the "resistance threshold" in one embodiment may be set directly on the basis of the SOC of the battery 37, by setting in advance the EV permission threshold Rb1 for each SOC on the basis of a test, a simulation, or the like. In an example embodiment illustrated in FIG. 8, the EV permission threshold Rb1 may be varied linearly. A method of varying the EV permission threshold Rb1, however, is not limited thereto. In some embodiments, the EV permission threshold Rb1 may be varied in a curved fashion. In an example embodiment illustrated in FIG. 8, the EV permission threshold Rb1 may be varied continuously. A method of varying the EV permission threshold Rb1, however, is not limited thereto. In some embodiments, the EV permission threshold Rb1 may be varied stepwise.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof. For example, a vehicle to which the vehicle controlling apparatus 10 according to an example embodiment of the technology is applied is not limited to the vehicle 11 of a hybrid type that includes the engine 12 and the motor generator 13 as the drive sources. In some embodiments, it is possible to effectively apply any embodiment of the technology to a vehicle that includes only the engine 12 as the drive source, as long as the vehicle has a start-stop function. In such example embodiments, the stop condition that stops the engine 12 may include, for example, a case where the vehicle speed falls below a predetermined value and where the brake pedal is pressed, and the start condition that starts the engine 12 may include, for example, a case where the pressing of the brake pedal is released or where the accelerator pedal is pressed.

In an example embodiment described above, the main processor 54 may include the traveling mode processor 63 and the resistance threshold setting unit 64. Locations at which the traveling mode processor 63 and/or the resistance threshold setting unit 64 are provided, however, are not limited thereto. In some embodiments, any other processor may include the traveling mode processor 63 and/or the resistance threshold setting unit 64. In an example embodiment described above, one battery sensor 40 includes the SOC detector 43 and the internal resistance detector 44. Locations at which the SOC detector 43 and the internal resistance detector 44 are provided, however, are not limited thereto. In some embodiments, the SOC detector 43 and the internal resistance detector 44 may be provided separately in respective two sensors. In some embodiments, the SOC detector 43 and the internal resistance detector 44 may be provided in any other processor. In an example embodiment described above, the starter generator 32 as the ISG may be used to start the engine 12. A method of starting the engine 12, however, is not limited thereto. In some embodiments, a starter motor may be used to start the engine 12. In one embodiment, the starter motor may serve as the "electric motor".

The main processor 54 including the traveling mode processor 63 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main processor 54. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main processor 54 including the traveling mode processor 63 illustrated in FIG. 2.

The invention claimed is:

1. A vehicle controlling apparatus to be applied to a vehicle, the vehicle controlling apparatus comprising:
   an engine processor configured to stop an engine of the vehicle on a basis of a stop condition, and start the engine on a basis of a start condition;
   an electric motor configured to start and rotate the engine upon starting the engine on the basis of the start condition;
   an electric power storage coupled to the electric motor;
   an SOC detector configured to detect a state of charge of the electric power storage;
   an internal resistance detector configured to detect an internal resistance of the electric power storage; and
   a resistance threshold setting unit configured to:
      determine that the state of charge is greater than a predetermined lower limit; and
      in response to determining that the state of charge is greater than the predetermined lower limit, calculate a resistance threshold on a basis of the state of charge,
   wherein the engine processor is configured to:
      prohibit, based on determining that the internal resistance is equal to or greater than the resistance threshold, a stop of the engine that is based on the stop condition; and
      permit the stop of the engine based on determining that the internal resistance is less than the resistance threshold, and
   wherein the resistance threshold setting unit is further configured to set a correction value based on the state of charge so that the correction value becomes smaller as the state of charge becomes greater, and use the correction value to calculate the resistance threshold,
   wherein the resistance threshold setting unit is configured to:
      when the state of charge is equal to the predetermined lower limit, set the correction value to a predetermined first value, the predetermined first value being a positive value;
      when the state of charge is a predetermined maximum value, set the correction value to zero; and
      calculate the resistance threshold by subtracting the correction value from a predetermined second value, wherein the predetermined second value is greater than the first predetermined value.

2. The vehicle controlling apparatus according to claim 1, wherein the engine processor is configured to:
   prohibit the stop of the engine, based on determining that the state of charge is equal to or less than the predetermined lower limit or that the internal resistance is equal to or greater than the resistance threshold; and
   permit the stop of the engine, based on determining that the state of charge is greater than the lower limit and that the internal resistance is less than the resistance threshold.

3. The vehicle controlling apparatus according to claim 1, wherein the resistance threshold setting unit is configured to set the resistance threshold to be smaller as the state of charge becomes lower.

4. The vehicle controlling apparatus according to claim 2, wherein the resistance threshold setting unit is configured to set the resistance threshold to be smaller as the state of charge becomes lower.

5. The vehicle controlling apparatus according to claim 1, wherein the correction value linearly proportional to the state of charge when the state of charge is greater than or equal to the predetermined lower limit and less than or equal to the predetermined maximum value.

6. A vehicle controlling apparatus to be applied to a vehicle, the vehicle controlling apparatus comprising:
   circuitry configured to stop an engine of the vehicle on a basis of a stop condition, and start the engine on a basis of a start condition;
   an electric motor configured to start and rotate the engine upon starting the engine on the basis of the start condition;
   an electric power storage coupled to the electric motor; and
   a battery sensor configured to detect a state of charge of the electric power storage and detect an internal resistance of the electric power storage, wherein
   the circuitry is further configured to:
      determine that the state of charge is greater than a predetermined lower limit;
      in response to determining that the state of charge is greater than the predetermined lower limit, calculate a resistance threshold on a basis of the state of charge;
      prohibit, based on determining that the internal resistance is equal to or greater than the resistance threshold, a stop of the engine that is based on the stop condition; and
      permit the stop of the engine based on determining that the internal resistance is less than the resistance threshold,
   wherein the circuitry is further configured to set a correction value based on the state of charge so that the correction value becomes smaller as the state of charge becomes greater, and use the correction value to calculate the resistance threshold,
   wherein the circuitry is configured to:
      when the state of charge is equal to the predetermined lower limit, set the correction value to a predetermined first value, the predetermined first value being a positive value;
      when the state of charge is a predetermined maximum value, set the correction value to zero; and
      calculate the resistance threshold by subtracting the correction value from a predetermined second value, wherein the predetermined second value is greater than the first predetermined value.

* * * * *